United States Patent Office 3,401,047
Patented Sept. 10, 1968

3,401,047
ANTI-STATIC NITROCELLULOSE LACQUERS
William David Garden, Saltcoats, Scotland, and John Smith, Canberra, Australian Capital Territory, Australia, assignors to Imperial Chemical Industries Limited, London, England, a corporation of Great Britain
No Drawing. Filed Nov. 12, 1964, Ser. No. 410,759
Claims priority, application Great Britain, Nov. 22, 1963, 46,199/63
4 Claims. (Cl. 106—186)

ABSTRACT OF THE DISCLOSURE

There is provided a lacquer for application to plastic films to render them heat-sealable, which lacquer contains an anti-static agent selected from ammonium or a primary or secondary alkanolamine salt of an inorganic oxo-acid wherein the alkyl group has at least 8 carbon atoms and an organic sulphonic acid having a long-chain alkyl substituent group having at least 8 carbon atoms. Particularly good anti-static agents are ethanolamine lauryl sulphate, ammonium lauryl sulphate, ammonium cetyl sulphate, ammonium stearyl sulphate, ethanolamine cetyl sulphate, ethanolamine dodecylbenzenesulphonate and ethanolamine stearyl sulphate.

---

This invention relates to anti-static film-forming nitrocellulose lacquer compositions, to the preparation of such lacquer compositions and to plastic sheets having coatings derived therefrom.

Nitrocellulose lacquers consist of non-volatile ingredients comprising nitrocellulose and plasticiser dissolved in a volatile solvent which, when the lacquer is applied to a surface, evaporates to leave on the surface a coating comprising the non-volatile ingredients. The characteristics of the coating are determined by the composition of the non-volatile ingredients of the lacquer, the particular solvent used being relatively unimportant. It has, therefore, become current practice to identify the lacquer by its non-volatile ingredients and to refer to the admixed non-volatile constituents of the lacquer as "lacquer" even when they are not dissolved in solvent as, for example, in a dried coating. The term "lacquer" is hereinafter used in accordance with this wider usage.

It has hitherto been proposed to apply to plastic films, such, for example, as polypropylene film, a coating of nitrocellulose lacquer to give a composite film which could be heat-sealed. Using the lacquers hitherto proposed the composite film has, however, the property of readily acquiring electrostatic charges in use, for example, when it is used with conventional packaging machinery. This property is a disadvantage since it makes handling of the film difficult as the films tend to stick to other objects, to stick together and to attract dust. The acquired charge also constitutes a potential spark source which could ignite solvent vapours during drying of the coated films.

It is an object of this invention to provide a nitrocellulose lacquer which is less liable to acquire electrostatic charges than the nitrocellulose lacquers hitherto available.

In accordance with this invention nitrocellulose lacquer comprises, as anti-static agent, a proportion of an ammonium or a primary or secondary alkanolamine salt of an inorganic oxo-acid containing a long-chain alkyl group having at least 8 carbon atoms. The salts may, for example, be sulphates, sulphonates or phosphates.

The anti-static agent may conveniently be an ammonium or ethanolamine salt of an alkyl sulphate or alkylbenzenesulphonate in which the alkyl group has at least 8 carbon atoms.

Suitable anti-static agents include, for example, ethanolamine lauryl sulphate, ammonium lauryl sulphate, ammonium cetyl sulphate, ammonium stearyl sulphate, ethanolamine cetyl sulphate, ethanolamine dodecylbenzenesulphonate and ethanolamine stearyl sulphate. Conveniently, the lacquer contains 5 to 20 parts of anti-static agent per 100 parts of nitrocellulose.

The incorporation of these anti-static agents into nitrocellulose lacquers not only imparts anti-static properties to the lacquers but also improves their "slip" characteristics, i.e. films coated with the lacquer will slide more easily against themselves or other surfaces, such, for example, as the metal parts of machinery. Clarity of a lacquer is in general unimpaired but if the long-chain alkyl group of the anti-static agent contains 16 or more carbon atoms, the lacquer coating may become hazy. This haze can be decreased by drying off lacquer solvent at an elevated temperature and, in such event, can be further decreased by incorporating water into the lacquer in an amount from 1 to 3 times the weight of anti-static agent. The anti-static agent may conveniently be dissolved in the water.

Nitrocellulose lacquers which contain a given long-chain alkyl sulphate ammonium salt have better "block" and "slip" characteristics than nitrocellulose lacquers containing the corresponding ethanolamine salt. In this context "blocking" is the tendency for several layers of film, e.g. the successive layers in a roll of film, to stick together which occurs when they are left in contact for a prolonged period, especially under conditions of elevated temperature or increased pressure. On the other hand the ethanolamine salts have a superior anti-static action to the corresponding ammonium salts. It is, therefore, in some cases, advantageous to use an anti-static agent comprising a mixture of ethanolamine and ammonium salts to obtain lacquers having good "block" and "slip" characteristics together with good anti-static properties.

The "slip" characteristics of a lacquer improve as the length of the long-chain alkyl group of the anti-static agent is increased, but correspondingly the solubility of the anti-static agent in the lacquer solution decreases and becomes undesirably low when the alkyl chain contains 16 or more carbon atoms. It has been found, however, that the solubility of anti-static agents containing a very long alkyl chain can be increased by admixture with an anti-static agent containing a relatively shorter alkyl chain. It is, therefore, advantageous to employ mixtures of anti-static agents having different alkyl chain lengths, the anti-static agents not being necessarily salts of the same amine.

Anti-static agents such, for example, as ammonium stearyl sulphate or mixtures thereof with ethanolamine stearyl sulphate, which contain very long alkyl groups and which have consequently low solubility in lacquers at room temperature, can, however, be incorporated into lacquers to give a homogeneous medium by mixing the anti-static agent with an excess of water and dispersing the mixture in the lacquer solution to give an emulsion of the "water-in-oil" type. The quantity of water is advantageously between 3 and 30 parts, and preferably 10 to 20 parts, to each part of anti-static agent. Such an emulsion can be coated at room temperature or only slightly elevated temperature but volatile constitutents of the emulsion have to be dried off from the wet coated film at elevated temperature, e.g., 70–110° C., in order to obtain clear films. The inclusion of small proportions of high boiling solvent in the lacquer solvent also improves the clarity of these lacquers.

The nitrocellulose lacquers of the invention are heat-sealable, although the anti-static agent usually reduces the heat-seal strength. However, this reduction in heat-seal strength of a lacquer applied to polypropylene film can be adequately compensated by increasing the corona discharge treatment of the base film before the application of the lacquer.

Lacquers particularly suitable as heat-sealable coatings for polypropylene film should preferably contain nitrocellulose and plasticiser in a ratio within the range 10:5 to 10:15 and at least 50 percent by weight of the plasticiser should be constituted by normally solid material (as proposed in our co-pending British application No. 47252/62 now British specification No. 985,291 which corresponds to United States application No. 329,216). The lacquer should preferably also contain an isocyanate compound having a plurality of isocyanate groups in its molecule, which ingredient increases both the adhesion of the lacquer to polypropylene film and its heat-seal strength. Other modifying ingredients such as, for example, resin, slip or anti-block agents, may, if desired, be added to the lacquer.

In accordance with a further aspect of the invention a plastic film such as, for example, a polypropylene film, has on at least one of its surfaces a coating layer of the nitrocellulose lacquer of the invention.

The invention is further illustrated by the following examples in which all parts and percentages are by weight, unless otherwise specified.

Examples 1–6

Lacquers having the compositions given in Table 1 were prepared.

TABLE 1

| Example | 1 | 2 | 3 | 4 | 5 | 6 |
|---|---|---|---|---|---|---|
| Nitrocellulose (as dry) | 10 | 10 | 10 | 10 | 10 | 10 |
| Dicyclohexyl phthalate | 8 | 8.4 | 8.4 | 8.4 | 8.4 | 8.4 |
| Triacetin | 1.5 | 3.3 | 1.6 | 3.3 | 1.1 | 1.1 |
| Ester gum resin | | 3.3 | | | | |
| Maleic modified ester gum | | | | 3.3 | | |
| Isocyanate solution | 1 | 0.5 | 0.5 | 0.5 | 1.0 | 1.0 |
| Ethanolamine lauryl sulphate (27% in water) | 3.3 | 3.3 | 1.9 | 3.3 | | |
| Ammonium lauryl sulphate (33% in water) | | | | | 2.7 | |
| Ethanolamine dodecylbenzene-sulphonate (33% in water) | | | | | | 2.7 |
| Finely divided clay (slip agent) | 0.13 | 0.16 | 0.12 | 0.16 | 0.13 | |
| Heat-seal strength (g./in.) | 120 | 90 | | 90 | | |

The nitrocellulose had an average nitrogen content between 11.2 and 11.8 percent and was "damped" with 30 parts isopropanol to 70 parts nitrocellulose. 20 g. (as dry) of the nitrocellulose used in Example 1 dissolved in 100 cc. aqueous acetone prepared by mixing 95 volumes acetone with 5 volumes water had a viscosity of 15–25 poises at 20° C. and 40 g. (as dry) of the nitrocellulose used in the remaining examples dissolved in 100 cc. of the same aqueous acetone had a viscosity of 3–5 poises at 20° C.

The isocyanate solution was a 75 percent solution in ethyl acetate of a product containing 19 percent of unreacted isocyanate groups prepared by reacting hexamethylene diisocyanate with water.

In compounding the lacquers all the ingredients except the isocyanate solution and the anti-static agent were dispersed in a solvent consisting of 60 percent butyl acetate and 40 percent toluene, the amount of solvent being that required to give a final lacquer solution containing, in Example 1, 10 percent and, in the remaining example, 25 percent of non-volatile ingredients. The isocyanate solution and the anti-static agent were then added in that order. The lacquer solution was applied to polypropylene film shortly after the addition of the isocyanate solution, i.e. while it still contained most of its unreacted isocyanate groups, to give, after drying, a 0.0013 mm. coating thereon. The polypropylene film had previously been treated by corona discharge, as described in United Kingdom Patent No. 715,914, to such an extent that its angle of contact with water was reduced to a value less than 80°. None of the coated films acquired any apparent electrostatic charge when rubbed vigorously with a dry cloth. The heat-seal strengths of the films given in the table were measured by the method described in our co-pending British application No. 47,252/62 now British specification No. 985,291 which corresponds to United States application. No. 329,216. In this method two pieces of film were sealed by pressing them together for ½ second at 130° C. and 0.28 kg./cm.$^2$, and the heat-seal strength was measured as the force required to separate the pieces over a width of 2.5 centimetres at a peel rate of 6 centimetres per minute.

Examples 7–14

The lacquers of these examples were prepared by incorporating the anti-static agents as listed in Table 2 with the following amount of base lacquer solids and dispersing in a solvent as described in Examples 2–6.

| | Parts |
|---|---|
| Nitrocellulose (as used in Examples 2–6) (as dry) | 10 |
| Dicyclohexyl phthalate | 8 |
| Triacetin | 3 |
| Maleic-modified ester gum | 3 |
| Finely divided clay (slip agent) | 0.12 |

TABLE 2

| | Parts by weight | | | Surface resistivity in ohms/square | |
|---|---|---|---|---|---|
| Example | Ethanolamine lauryl sulphate 27% in water (as dry) | Ammonium lauryl sulphate 33% in water (as dry) | Slip | At 34% relative humidity | At 50% relative humidity |
| 7 | 1.00 | | Poor | $10^9$ | $10^8$ |
| 8 | 0.75 | 0.25 | do | $10^9$ | $10^9$ |
| 9 | 0.50 | 0.50 | do | $10^9$ | $10^9$ |
| 10 | 0.25 | 0.75 | Fair | $10^{10}$ | $10^9$ |
| 11 | 0.20 | 0.80 | Good | $10^{11}$ | |
| 12 | 0.15 | 0.85 | do | $10^{12}$ | |
| 13 | 0.10 | 0.90 | do | $10^{13}$ | |
| 14 | | 1.00 | do | $10^{13}$ | $10^{10}$ |

The lacquer solution was applied to polypropylene film as described in Examples 1–6 and the "slip" and surface resistivity was measured.

Table 2 shows the superiority in "slip" characteristics and the inferiority in surface resistivity of lacquer containing the ammonium salt compared to those containing a corresponding amount of an ethanolamine salt. The surface resistivity is a measure of the ability of the surface to dissipate an electrostatic charge developed thereon. A polypropylene film coated with nitrocellulose lacquer having a surface resistivity of $10^{12}$ ohms/square or less shows anti-static properties such that any electrostatic charge developed on the surface will be rapidly dissipated so that, for example, the film when rubbed with a dry cloth will not apparently acquire any electrostatic charge. The mixtures of ammonium and ethanolamine salts used in Examples 11 and 12 gave lacquers having good "slip" with a surface resistivity of $10^{12}$ or less even at the very low atmospheric relative humidity value of 34 percent.

Example 15

The lacquer of this example contained a mixture of anti-static agents having different alkyl chains and had the following composition:

| | Parts |
|---|---|
| Nitrocellulose (as used in Example 1) (as dry) | 10 |
| Dicyclohexyl phthalate | 6 |
| Tricyclohexyl citrate | 4 |
| o/p-N-ethyltoluenesulphonamide | 2 |
| Ethanolamine lauryl sulphate, 27% in water | 1.1 |
| Ammonium stearyl sulphate 25% in water | 1.2 |
| Ammonium lauryl sulphate, 33% in water | 1.2 |
| Isocyanate solution (as used in Examples 1–6) | 1 |
| Finely divided clay (slip agent) | 0.12 |

In preparing the lacquer the above ingredients, with the exception of the three sulphates and the isocyanate solution, were dispersed in a solvent consisting of 55 parts ethyl acetate, 5 parts butyl acetate and 40 parts toluene. The three sulphates and the isocyanate solution were then added and the mixture was heated to 40° C. in a water bath and stirred fo 15 minutes to ensure dissolution of the sulphates, particularly the ammonium stearyl sulphate. The concentration of solids in the lacquer solution was 10 percent, allowance being made for the isopropanol "damping" of the nitrocellulose and the water associated with the sulphates.

This lacquer solution was maintained at 30° C., which was a sufficiently elevated temperature to maintain the lacquer solution homogeneous, and coated onto two different samples of polypropylene film to give, on each sample, a coating layer 0.0013 millimetre thick after drying off volatile constituents for 15 seconds at an air temperature of 90° C. One sample of film had been surface treated by corona discharge to the extent that the contact angle of a drop of water on its surface was 72°. The other sample of film had been given a greater degree of discharge treatment and had a contact angle of 62°.

The heat-seal strength of the films was determined as described in British application No. 47,252/62 now British specification No. 985,291 which corresponds to United States application No. 329,216 except that the films were sealed at a temperature of 120° C. and for a time of 1 second.

The films had the following properties:

TABLE 3

| Polypropylene film contact angle (deg.) | Heat-seal strength, g./in. | Surface resistivity, ohm/square at 40% relative humidity | Slip |
|---|---|---|---|
| 72 | 70 | $10^{11}$ | Good. |
| 62 | 110 | $10^{11}$ | Do. |

The heat-seal strength of the coatings shows that a greater degree of discharge treatment gives a stronger heat-seal. Both films had satisfactory anti-static properties.

Examples 16–18

The lacquers of these examples had the following compositions:

TABLE 4

| Example | 16 | 17 | 18 |
|---|---|---|---|
| Nitrocellulose (as used in Example 1) (as dry) | 10 | 10 | 10 |
| Dicyclohexyl phthalate | 6 | 6 | 6 |
| Tricyclohexyl citrate | 4 | 4 | 4 |
| o/p-N-ethyltoluenesulphonamide | 2 | 2 | 2 |
| Ammonium lauryl sulphate, 33% in water | 3 | 1.5 | |
| Ammonium cetyl sulphate, 25% in water | | 2 | 4 |
| Isocyanate solution (as used in Example 1) | 1 | 1 | 1 |
| Finely divided clay | 0.12 | 0.12 | 0.12 |
| Slip (friction coefficient) | 0.31 | 0.25 | 0.24 |

The lacquers of Examples 16 and 17 were prepared in the same way as that of Example 15 and the lacquer of Example 18 was similarly prepared but the lacquer solution had to be heated to 50° C. to dissolve the ammonium cetyl sulphate. The lacquers in Examples 16 and 17 when coated onto polypropylene film at 30° C. gave clear films, but to obtain a clear film from the lacquer of Example 18, the lacquer had to be applied to the polypropylene by an apparatus which maintained and applied the lacquer at a temperature of 50° C. and immediately dried off the solvent without allowing the wet coated film to cool. The films from all the lacquers showed satisfactory anti-static properties. "Slip" values for polypropylene films coated with the lacquer as described in previous examples are expressed in Table 4 as the coefficient of kinetic friction and were determined by laying a 1 inch stainless steel cube wrapped with the film on a flat portion of film and determining the angle of inclination at which the cube just continued to slide.

The lacquer of Example 17 is to be preferred to those of Examples 16 and 18 since it can be coated at 30° C. and yet has good slip properties. Omission of the anti-static agent from these lacquer compositions gave a lacquer having a "slip" value of 0.41.

Example 19

The composition of the lacquer of this example was

| | Parts |
|---|---|
| Nitrocellulose (as used in Examples 2–14) (as dry) | 10 |
| Tricyclohexyl citrate | 12 |
| Isocyanate solution (as used in Examples 1–6) | 1 |
| Ethanolamine stearyl sulphate, 21% in water (as dry) | 0.75 |
| Ammonium stearyl sulphate, 27% in water (as dry) | 0.75 |
| Finely divided clay ("slip" agent) | 0.12 |

The lacquer solution was prepared by first dissolving the nitrocellulose, tricyclohexyl citrate, isocyanate solution and 3 parts of the high boiling solvent, methylcyclohexyl acetate, in solvent of the composition used in Example 15, and adding the "slip" agent to give a base lacquer. The anti-static agents were mixed with 30 parts water and 3 parts of ethyl acetate (to aid dissolution of the anti-static agents) and the mixture was stirred and warmed to 35° C., when a solution was obtained. This solution was poured into the cold base lacquer with rapid stirring to give a stable emulsion containing 72 percent of solids.

This emulsion was coated onto polypropylene film at room temperature and the volatile constituents were dried off at 80° C. The film produced had good "slip" and was clear and anti-static, the surface resistivity being $10^{11}$ ohms/square at 40 percent relative humidity.

What we claim is:

1. Nitro cellulose lacquers containing an anti-static agent selected from the group consisting of ethanolamine lauryl sulphate, ammonium lauryl sulphate, ammonium cetyl sulphate, ammonium stearyl sulphate, ethanolamine cetyl sulphate, ethanolamine dodecylbenzenesulphonate, ethanolamine stearyl sulphate or mixtures thereof.

2. Lacquer as claimed in claim 1 containing 5 to 20 parts of anti-static agent per hundred parts of nitrocellulose.

3. A plastic film coated on at least one of its surfaces with a layer of nitrocellulose lacquer as claimed in claim 1.

4. A polypropylene film coated on at least one of its surfaces with a layer of nitrocellulose lacquer as claimed in claim 1.

References Cited

UNITED STATES PATENTS

| 2,233,001 | 2/1941 | Dickey. |
| 2,279,502 | 4/1942 | Dickey. |
| 2,597,708 | 5/1952 | Cresswell. |
| 2,570,094 | 10/1951 | Bradley. |
| 2,197,930 | 4/1940 | Jackson. |
| 2,723,246 | 11/1955 | Boyd. |
| 2,584,337 | 2/1952 | Famulener. |

FOREIGN PATENTS

| 526,881 | 6/1956 | Canada. |

JULIUS FROME, *Primary Examiner.*